(12) United States Patent
Clare et al.

(10) Patent No.: US 12,491,705 B2
(45) Date of Patent: Dec. 9, 2025

(54) STAND UP POUCH WITH RECYCLED POLYETHYLENE

(71) Applicant: NOVA CHEMICALS (INTERNATIONAL) S.A., Fribourg (CH)

(72) Inventors: Robert Clare, Cochrane (CA); Ian Gibbons, Calgary (CA); Daniel Ward, Maineville, OH (US); Allister Davey, Didsbury (CA)

(73) Assignee: NOVA Chemicals (International) S.A., Fribourg (CH)

( * ) Notice: Subject to any disclaimer, the term of this patent is extended or adjusted under 35 U.S.C. 154(b) by 859 days.

(21) Appl. No.: 17/761,155

(22) PCT Filed: Sep. 14, 2020

(86) PCT No.: PCT/IB2020/058520
§ 371 (c)(1),
(2) Date: Mar. 16, 2022

(87) PCT Pub. No.: WO2021/053492
PCT Pub. Date: Mar. 25, 2021

(65) Prior Publication Data
US 2023/0347629 A1    Nov. 2, 2023

Related U.S. Application Data

(60) Provisional application No. 62/903,109, filed on Sep. 20, 2019.

(51) Int. Cl.
*B32B 27/08* (2006.01)
*B32B 7/02* (2019.01)
(Continued)

(52) U.S. Cl.
CPC ............. *B32B 27/08* (2013.01); *B32B 7/02* (2013.01); *B32B 27/18* (2013.01); *B32B 27/306* (2013.01);
(Continued)

(58) Field of Classification Search
CPC ............... B32B 2250/242; B32B 2439/70
See application file for complete search history.

(56) References Cited

U.S. PATENT DOCUMENTS 5,342,868 A    8/1994  Kimura et al.
5,693,283 A *  12/1997 Fehn .................. B32B 27/32
                                                   264/513

(Continued)

FOREIGN PATENT DOCUMENTS

CA      2612940       1/2007
CN     107206766 A    9/2017
(Continued)

OTHER PUBLICATIONS

ASTM D 1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
(Continued)

*Primary Examiner* — Michael C. Romanowski
(74) *Attorney, Agent, or Firm* — Thomas J. Styslinger

(57) ABSTRACT

In some embodiments a Stand Up Pouch (SUP) is prepared using a polyethylene structure having a first web and a second web. The webs are laminated together to form the polyethylene structure that is used to prepare the SUP. One web contains a layer of recycled polyethylene (r.PE). In some instances, the use of r.PE has been observed to reduce the effectiveness of the sealant layer of the overall structure.

(Continued)

In some embodiments, the SUP disclosed herein has a two layer sealant system to mitigate this problem.

20 Claims, 2 Drawing Sheets

(51) Int. Cl.
*B32B 27/18* (2006.01)
*B32B 27/30* (2006.01)
*B32B 27/32* (2006.01)
*B65D 75/00* (2006.01)
*B65D 75/26* (2006.01)

(52) U.S. Cl.
CPC ............ *B32B 27/32* (2013.01); *B65D 75/008* (2013.01); *B65D 75/26* (2013.01); *B32B 2250/24* (2013.01); *B32B 2270/00* (2013.01); *B32B 2272/00* (2013.01); *B32B 2307/31* (2013.01); *B32B 2307/72* (2013.01); *B32B 2307/7244* (2013.01); *B32B 2307/7246* (2013.01); *B32B 2307/748* (2013.01); *B32B 2439/46* (2013.01); *B32B 2439/70* (2013.01); *Y02W 30/80* (2015.05)

(56) References Cited

U.S. PATENT DOCUMENTS

| | | | |
|---|---|---|---|
| 5,783,637 A * | 7/1998 | Herman | B29C 49/0005 215/44 |
| 5,981,636 A | 11/1999 | Amos et al. | |
| 6,465,551 B1 | 10/2002 | Zhao et al. | |
| 6,599,971 B2 | 7/2003 | Dotson et al. | |
| 7,737,220 B2 | 6/2010 | Swabey et al. | |
| 2006/0177641 A1* | 8/2006 | Breese | B32B 27/08 428/910 |
| 2006/0188678 A1* | 8/2006 | Ohlsson | B32B 27/20 428/218 |
| 2016/0229157 A1 | 8/2016 | Clare | |
| 2016/0332430 A1* | 11/2016 | Rosa | B32B 27/08 |
| 2016/0339663 A1* | 11/2016 | Clare | B32B 27/18 |
| 2017/0121082 A1* | 5/2017 | Tiwari | B65D 75/566 |
| 2018/0050854 A1* | 2/2018 | Franca | B32B 1/00 |
| 2018/0370202 A1* | 12/2018 | Niedersüss | B32B 27/08 |
| 2019/0344551 A1* | 11/2019 | Grefenstein | B65D 65/40 |
| 2020/0238674 A1* | 7/2020 | Sehanobish | B32B 27/08 |
| 2021/0023828 A1* | 1/2021 | Yamada | B65D 31/08 |
| 2021/0054951 A1* | 2/2021 | Diels | A47L 9/248 |
| 2021/0354333 A1* | 11/2021 | Otsuka | B29B 17/04 |
| 2022/0227977 A1* | 7/2022 | Kleczek | C08L 23/06 |

FOREIGN PATENT DOCUMENTS

| | | |
|---|---|---|
| CN | 111051053 A | 4/2020 |
| EP | 0 772 548 | 5/1997 |
| EP | 3 256 317 | 12/2017 |
| JP | 2002-120849 A | 4/2002 |
| JP | 3555279 B2 | 8/2004 |
| JP | 2012-229037 A | 11/2012 |
| JP | 2018-511504 A | 4/2018 |
| TW | 201910461 A | 3/2019 |

OTHER PUBLICATIONS

ASTM D1003-13 Standard Test methods for Haze and Luminous transmittance of Transparent plastics—Copyright ASTM International—Current edition approved Nov. 15, 2013. Published Nov. 2013. Originally approved in 1949. Last previous edition approved in 2011 as D1003-1 (pp. 1-7).

ASTM D2457-13—Standard Test Method for Specular Gloss of Plastic Films and Solid Plastics—Copyright ASTM International—Current edition approved Apr. 1, 2013. Published Apr. 2013. Originally approved in 1965. Last previous edition approved in 2008 as D2457-08 (pp. 1-6).

ASTM D6474-99 (Reapproved 2006)—Standard Test Method for Determining Molecular Weight Distribution and Molecular Weight Averages of Polyolefins by High Temperature Gel Permeation Chromatography. Copyright ASTM International. Current edition approved Mar. 15, 2006. Published Apr. 2006. Originally approved in 1999. Last previous edition approved in 1999 as D6474-99. pp. 1-6.

ASTM D792-13 Standard Test Methods for Density and Specific Gravity (Relative Density) of Plastics by Displacement, ASTM International, Nov. 2013 (6 pages).

* cited by examiner

STAND UP POUCH WITH RECYCLED POLYETHYLENE

CROSS-REFERENCE TO RELATED PATENT APPLICATIONS

This application is a U.S. National Phase Application under 35 U.S.C. § 371 of International Application No. PCT/IB2020/058520, filed Sep. 14, 2020, which claims the benefit of priority to U.S. Provisional Application No. 62/903,109, filed on Sep. 20, 2019, both of which are incorporated herein by reference in their entirety.

This disclosure relates to a laminated structure that is prepared by laminating a first polyethylene web to a second polyethylene web. The laminated structure is, for example, suitable for the preparation of a stand up pouch (SUP). The SUP is made with recycled polyethylene and is recyclable.

Stand up pouch ("SUP") packages are in widespread commercial use as packaging for consumer goods. These pouches are attractive to consumers and, when properly designed, make very efficient use of a minimal amount of polymeric material to prepare the package.

SUP packages were first produced more than 30 years ago. An early design uses a laminate of a layer of PolyEthyleneTerephalate (PET) and a layer of PolyEthylene (PE). This type of design is still in commercial use with a typical structure having a thin layer (about 0.5 mils, or 0.12 mm thick) of PET and a thicker layer (about 3 mils or 0.75 mm) of PE.

A problem with this SUP design is that the pouches are difficult to recycle because of the different materials of construction.

It is known to prepare a "recyclable" SUP that is prepared only with polyethylene (or with at least 95% PE, as many recycling facilities are able to recycle a coextruded or laminated film that contains at least 95% PE as a "pure" PE material). For example, US Patent Application Publication No. 2016/0229,157 (to NOVA Chemicals) describes a SUP that contains at least 95 weight % PE and hence is recyclable.

A further need is to use recycled polyethylene ("r.PE") in a new pouch. We have observed that the inclusion of r.PE in a SUP can reduce the effectiveness of the sealant layer in the film structure used to prepare the SUP. We have now discovered that a two layer sealant system mitigates this problem and provides enhanced seal effectiveness.

SUMMARY OF INVENTION

Disclosed herein are laminated structures made from polymeric materials, the laminated structure including:
A) an outer web including:
  A.1) a first-A layer including an HDPE composition, and
  A.2) a second-A layer including polyethylene chosen from LLDPE, MDPE, and HDPE;
B) an inner web including:
  B.1) a first-B layer that is in contact with the outer web, wherein the first-B layer includes polyethylene chosen from LLDPE and MDPE,
  B.2) a second-B layer including recycled polyethylene, and
  B.3) a sealant structure including:
    B.3.1) a sealant skin layer including a polyethylene sealant, and
    B.3.2) a layer adjacent to the sealant skin layer including a polyethylene having a density that is a) higher than the density of the polyethylene sealant and b) lower than the density of the core layer that is in contact with the layer adjacent to the sealant skin layer; and
wherein
  I) the outer web is laminated to the inner web, and
  II) the HDPE, MDPE, LLDPE, recycled polyethylene and polyethylene sealant collectively form at least 95 weight % of the polymeric materials that are used to prepare the laminated structure.

Disclosed herein are laminated structures made from polymeric materials, the laminated structure including:
A) an outer web including:
  A.1) a first-A layer including an HDPE composition,
  A.2) a second-A layer including polyethylene chosen from LLDPE, MDPE, and HDPE, and
  A.3) a third-A layer including polyethylene chosen from LLDPE, MDPE, and HDPE;
B) an inner web including:
  B.1) a first-B layer that is in contact with the outer web, wherein the first-B layer includes polyethylene chosen from HDPE, LLDPE and MDPE,
  B.2) a second-B layer including recycled polyethylene, and
  B.3) a sealant structure including:
    B.3.1) a sealant skin layer including a polyethylene sealant, and
    B.3.2) a layer adjacent to the sealant skin layer including a polyethylene having a density that is a) higher than the density of the polyethylene sealant and b) lower than the density of the core layer that is in contact with the layer adjacent to the sealant skin layer; and wherein
  I) each of the outer and inner webs optionally comprise at least one additional polyethylene layer between A.1 and A.3 and B.1 and B.3,
  II) the outer web is laminated to the inner web, and
  III) the HDPE, MDPE, LLDPE, recycled polyethylene and polyethylene sealant collectively form at least 95 weight % of the polymeric materials that are used to prepare the laminated structure.

DESCRIPTION OF EMBODIMENTS

Figure 1:
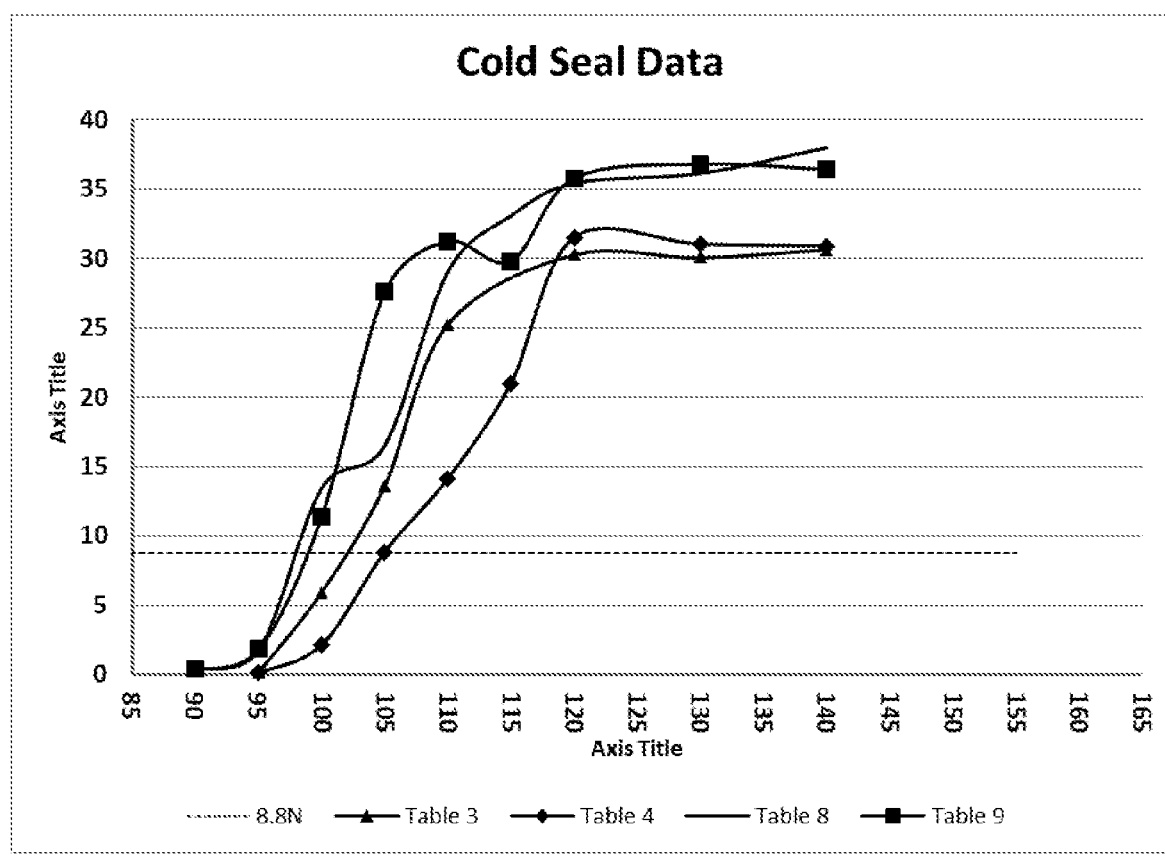
FIGS. 1 and 2 illustrate properties of seals prepared using different interior webs.
Figure 2:
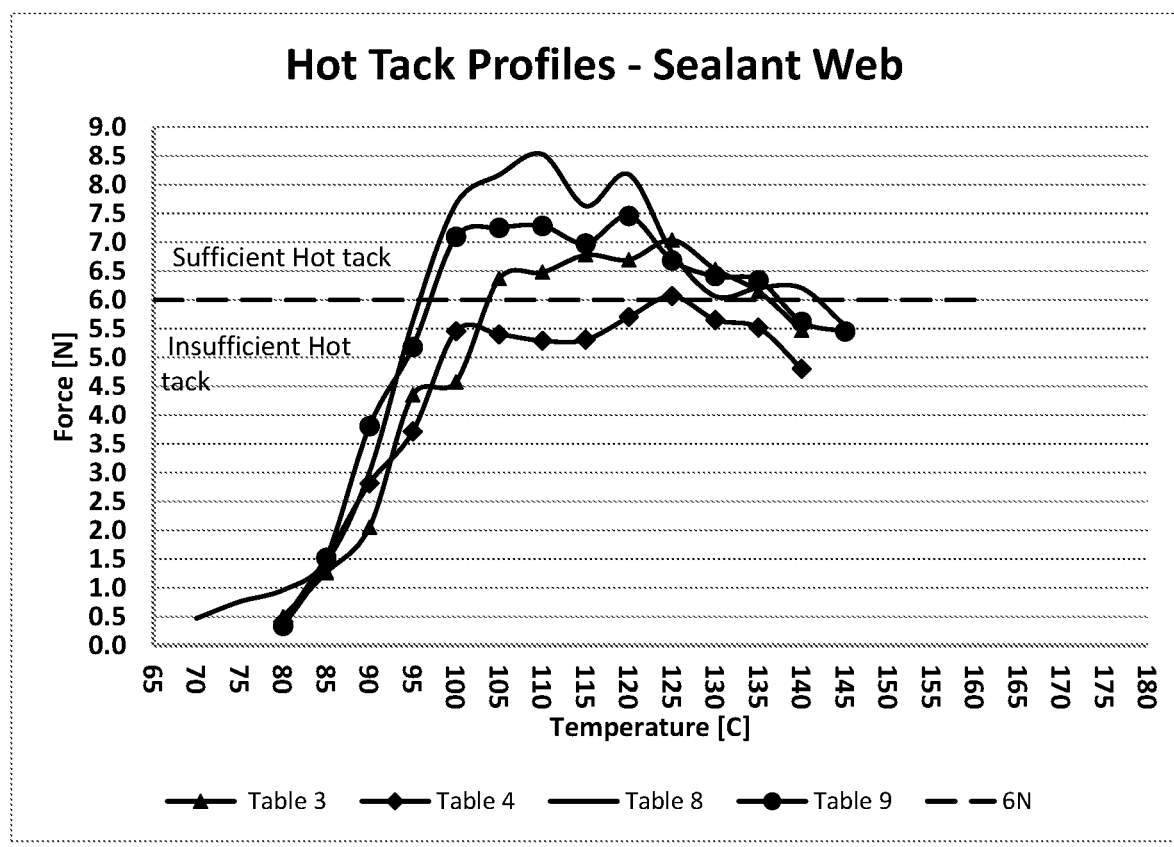

In one embodiment, the polymeric material used to make the SUP includes different types of polyethylene. In one embodiment, the polymeric material used to make the SUP consists essentially of different types of polyethylene—i.e. the only polymeric material used to make the SUP of this embodiment is polyethylene. The term polyethylene refers to polymers that contain ethylene and may contain an optional comonomer.

Suitable examples of polyethylene include:
1) High Density Polyethylene (HDPE)—a polyethylene homopolymer or copolymer having a density of from about 0.95 to about 0.97 g/cc;
2) Medium Density Polyethylene (MDPE)—a polyethylene copolymer having a density of from about 0.93 to about 0.95 g/cc;
3) Linear Low Density Polyethylene (LLDPE)—a polyethylene copolymer having a density of from about 0.915 to about 0.93 g/cc; and 4) a polyethylene sealant—a polyethylene material that is suitable for the preparation of a heat formed seal, or for example, a polyethylene selected from 1) a polyethylene copolymer having a density of from about 0.88 to 0.915 g/cc ("VLDPE"); and 2) a high pressure low density polyethylene (LD)—a polyethylene homopolymer prepared with a free radical initiator in a high pressure process, having a density of from about 0.91 to about 0.93 g/cc.

In some embodiments, just the outer web comprises an HDPE layer. In another embodiment, both the inner and the outer webs of the laminated structure include HDPE in at least one layer. The HDPE layers provide rigidity/stiffness to the SUP. In one embodiment, these HDPE layers are separated by at least one layer of lower density polyethylene (such as LLDPE) and this lower density polyethylene provides impact and puncture resistance. In addition, by separating the layers of rigid HDPE, the overall rigidity and torsional strength of the SUP is improved in comparison to a structure that contains an equivalent amount/thickness of HDPE in a single layer—in a manner that might be referred to as an "I beam" effect (by analogy to the steel I beams that are in wide sue for the construction of buildings).

The "adjacent to" layer is in contact with the sealant skin layer one side and, on the other side of the adjacent to layer, is in contact with a core layer. The adjacent to layer includes a polyethylene composition having a density that is higher than the density of the sealant skin layer but lower than the density of the core layer that it also is in contact with. In an embodiment, the polyethylene composition is a blend of polyethylenes, in another embodiment it includes of a single type of polyethylene.

In embodiments where the outer and inner webs optionally comprise at least one additional polyethylene layer between A.1 and A.3 and B.1 and B.3, the additional layers include polyethylene compositions including HDPE, MDPE, LLDPE, or combinations thereof. In additional embodiments these layers consist of HDPE, MDPE, LLDPE, or combinations thereof. In additional embodiments these layers include recycled polyethylene. In additional embodiments these layers consist of recycled polyethylene.

It will be appreciated by those skilled in the art that when preparing a blown multilayer film on multilayer line equipment that each layer may be produced by a single line, or a "layer" may result from multiple consecutive lines producing layers of identical composition in consecutive layers. As an example, a five layer line could produce a structure of compositions A/B/C/D/E, producing a 5 layer film. Alternatively, the same five layer line could be used to create a 5 layer film of A/A/B/C/C composition effectively producing a three layer film.

In some embodiments, the laminated structure of this disclosure is suitable for the preparation of a Stand Up Pouch (SUP).

SUP packages are well known. They are typically prepared from "roll stock" (i.e., a film—or a laminated structure as disclosed herein) using a variety of well-known techniques and machines.

SUPs are manufactured in many sizes, and are typically used to package consumer goods in small quantities (e.g., from about 25 mils to 2 liters). The contents of the SUP packages are typically described as being "flowable"—with the term "flowable" being intended to encompass particulate solids (such as candy, nuts, and breakfast cereal); liquids (for example, drinks); and pastes/emulsions/purees (such as yogurt and baby foods). In an embodiment, the SUP is designed to allow the contents of the opened package to easily flow from (and/or to be consumed directly from) the SUP. For example, the top of the SUP may be equipped with an integral straw (for drinks) or spout for pastes, emulsions, purees, and the like. Such designs are well-known and one example is disclosed in Canadian Patent Application Serial No. 2,612,940 (Rogers).

In some embodiments, the SUP is typically opened at the top of the package. The SUP may be opened with a tear strip; or a fitment (or cap) which allows the package to be re-closed; or other caps/closures, etc. that are known to those skilled in the art.

In one embodiment, the laminated structure is printed at the interface between the two webs—i.e., either on the interior surface of the first web or on the exterior surface of the second web.

Detailed descriptions for various embodiments of the first (exterior) web; various embodiments of the second (interior) web; various embodiments of the adhesive, and various embodiments of the printing follow.

In one embodiment, the first (exterior) web forms the outer wall of the laminated structure.

In one embodiment, the laminated structure is printed on the interface between the first web and the second (interior) web.

Because one "looks through" the exterior web in order to see the printing, in some embodiments, it may be desirable for the exterior web to have low haze values. In addition, in some embodiments, a high "gloss" may be desirable as many consumers perceive a high gloss finish as being an indication of high quality.

Furthermore, in some embodiments, it is desirable for the exterior layer to provide stiffness/rigidity to the laminated structure so that a SUP made from the laminated structure will be self-supporting.

Thus, a balance of good optical properties and stiffness may be desired for the exterior web. It is known that HDPE can provide the desired stiffness but it is also known that HDPE may have poor optical properties. Thus, in one embodiment, a very thin layer of HDPE is used as a skin layer in the exterior web, together with a layer of a lower density polyethylene.

Further descriptions of these embodiments follow.

Multi-Layer Outer Web, or Web A

In general, the use of a thick monolayer HDPE film to form the exterior web of a SUP could be used to provide a structure with adequate stiffness. However, a thick layer of HDPE may suffer from poor optical properties. This could be resolved by printing the exterior (skin) side of the outer web to form an opaque SUP. However, this design may not be very abuse resistant as the printing can be easily scuffed and damaged during transportation and handling of the SUP.

In one embodiment, the structure disclosed herein mitigates these problems by providing a coextruded multilayer film for the exterior web in which at least one layer ("layer A.1") is prepared from HDPE and at least one layer ("layer A.2") is prepared from a lower density polyethylene (such as LLDPE, LD or VLDPE).

In one embodiment, the HDPE is further characterized by having a melt index, $I_2$, of from 0.1 to 10 (or for example, from 0.3 to 3) grams/10 minutes.

In one embodiment, the first A-layer is an HDPE composition including a nucleating agent.

In one embodiment, the LLDPE is further characterized by having a melt index, $I_2$, of from 0.1 to 5 (or for example, from 0.3 to 3) grams/10 minutes.

In one embodiment, the LLDPE is further characterized by being prepared using a single site catalyst (such as a metallocene catalyst) and having a molecular weight distribution, Mw/Mn (i.e., weight average molecular weight divided by number average molecular weight) of from about 2 to about 4. This type of LLDPE is typically referred to as sLLDPE.

In one embodiment, the very low density polyethylene (VLDPE) is an ethylene copolymer having a density of from about 0.88 to 0.915 g/cc and a melt index, $I_2$, of from about 0.5 to 10 g/cc. All of the materials described above are well known and commercially available.

The lower density polyethylene can improve the optics of the multilayer web. In one embodiment, the multilayer structure is a three layer, coextruded film of the type A/B/A where A is an LLDPE (for example, a single site catalyzed LLDPE) and B is an HDPE composition. This type of film provides excellent optical properties—to the point where, in some embodiments, some of these films have been observed to have better optical properties than a monolayer film made with the same LLDPE.

In another embodiment, the LLDPE used in web A is blended with a minor amount (from 0.2 to 10 weight %) of an LD polyethylene having a melt index, $I_2$, of from 0.2 to 5, or for example, from 0.2 to 0.8. Certain blends of these LLDPE and LLDPE and LD have been observed to have superior optical properties and superior stiffness in comparison to the LLDPE alone (particularly when the LLDPE is a sLLDPE).

In some embodiments, the use of an LD resin having a melt index of from about 0.2 to 0.8 grams/10 minutes has been observed to be effective for this purpose (and persons skilled in the art commonly refer to this type of LD resin as a "fractional melt LD").

In another embodiment, the LLDPE used in web A is blended with a minor amount (from 0.2 to 10 weight %) of an HDPE resin and a nucleating agent.

The term "nucleating agent", as used herein, is meant to convey its conventional meaning to those skilled in the art of preparing nucleated polyolefin compositions, namely an additive that changes the crystallization behavior of a polymer as the polymer melt is cooled.

Examples of conventional nucleating agents which are commercially available and in widespread use as polypropylene additives are the dibenzylidene sorbital esters (such as the products sold under the trademark MILLAD® 3988 by Milliken Chemical and IRGACLEAR® by Ciba Specialty Chemicals).

In some embodiments, the nucleating agents should be well dispersed in the polyethylene. In some embodiments, the amount of nucleating agent used is comparatively small—from 200 to 10,000 parts by million per weight (based on the weight of the polyethylene) so it will be appreciated by those skilled in the art that some care must be taken to ensure that the nucleating agent is well dispersed. In some embodiments, the nucleating agent in finely divided form (less than 50 microns, or for example, less than 10 microns) to the polyethylene to facilitate mixing.

Examples of nucleating agents which may be suitable for use include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken; the salts of certain cyclic dicarboxylic acids having a hexahydrophtalic acid structure (or "HHPA" structure) as disclosed in U.S. Pat. No. 6,599,971 (Dotson et al., to Milliken); phosphate esters, such as those disclosed in U.S. Pat. No. 5,342,868 and those sold under the trade names NA-11 and NA-21 by Asahi Denka Kogyo and metal salts of glycerol (or for example, zinc glycerolate). The calcium salt of 1,2-cyclohexanedicarboxylic acid, calcium salt (CAS registry number 491589-22-1) typically provides good results for the nucleation of HDPE. The nucleating agents described above might be described as "organic" (in the sense that they contain carbon and hydrogen atoms) and to distinguish them from inorganic additives such as talc and zinc oxide. Talc and zinc oxide are commonly added to polyethylene (to provide anti-blocking and acid scavenging, respectively) and they do provide some limited nucleation functionality.

The "organic" nucleating agents described above may be better (but more expensive) nucleating agents than inorganic nucleating agents. In an embodiment, the amount of organic nucleating agent is from 200 to 2000 parts per million (based on the total weight of the polyethylene in the layer that contains the nucleating agent).

In some embodiments, these LLDPE/HDPE/nucleating agent blends have also been found to provide superior optical properties and higher modulus (higher stiffness) than 100% LLDPE.

In another embodiment, the outer web is a three layer, coextruded film of the type A/B/A where A is an HDPE and B is a lower density polyethylene, for example, the LLDPE compositions described above (including the LLDPE compositions that are blends with LD and LLDPE compositions that are blends with HD and a nucleating agent). These films provide good rigidity.

B. Inner Web—(with Recycle Polyethylene); Also "B" Web; Also "Sealant" Web

The inner web forms the inside of a SUP that is prepared from the laminated structure.

B.1) a first-B layer that is in contact with the outer web, wherein the first-B layer includes polyethylene chosen from HDPE, LLDPE and MDPE, B.2) a second-B layer including recycled polyethylene, and B.3) a sealant structure including:
  B.3.1) a sealant skin layer including a polyethylene sealant, and
  B.3.2) a layer adjacent to the sealant skin layer including a polyethylene having a density that is a) higher than the density of the polyethylene sealant; and b) lower than the density of the core layer that is in contact with the layer adjacent to the sealant skin layer.

B.1 Interface Skin Layer

One skin layer of the inner web is prepared from a polyethylene composition having a lower density than HDPE so as to provide a layer having enhanced impact and tear strength properties in comparison to the layers prepared from HDPE. In one embodiment, this layer is made predominantly from an LLDPE, (including sLLDPE) having a melt index of from 0.3 to 3 grams per 10 minutes. The layer may also be prepared using a major amount of LLDPE (or sLLDPE) and a minor amount of LD (for example, a fractional melt LD, as described above) or the LLDPE+ HDPE+nucleating agent blend as described above.

In another embodiment, this skin layer may be prepared with MDPE (or a blend of MDPE with a minor amount of another polyethylene, such as the blends with LD; and the blends with HDPE and nucleating agent described above).

In one embodiment, this skin layer is printed. Accordingly, it is within the scope of this disclosure to incorporate any of the well-known film modifications that facilitate the printing process. For example, the skin layer may be subjected to a corona treatment to improve ink adhesion. In another embodiment, the skin layer may contain an opacifying agent (such as talc, titanium oxide or zinc oxide) to improve the appearance of the printed surface.

B.2 A Core Layer Including Recycled Polyethylene (r.PE)

The inner web includes at least one layer including r.PE. The inner web includes a core layer including r.PE. In an embodiment, the core layer consists essentially of r.PE (i.e. all of the polymer used in this layer is r.PE).

There are many sources and types of recycled polyethylene that are useful for the various embodiments disclosed herein. As used herein, the term recycled polyethylene (or r.PE) refers a recycled polyethylene independent of its source.

In one example, recycled polyethylene is any polyethylene that has been exposed to at least one "heat history"—that is it has been melted or molded or extruded at least once. In an embodiment, the r.PE may be post industrial recycle (PIR) which generally refers to polyethylene that has been used in a manufacturing process but not sold to an end consumer (such PIR polyethylene is commonly produced as scrap; trimmings or off specification parts in a manufacturing process—it is recovered for reuse either in the same process or alternatively, it may be sold to other manufacturers/converters for use in a different process).

In an embodiment, the r.PE is post consumer recycle polyethylene (or "PCR"). PCR is recovered from waste streams and cleaned prior to reuse.

In a specific embodiment, the PCR is prepared from recycled containers for liquids (for example, milk or juices).

The r.PE may have a density of from 0.910 to 0.97 g/cc and a melt index, $I_2$, of from 0.2 to 20.

In an embodiment, the r.PE has a density of from 0.93 to 0.95 g/cc and a melt index, $I_2$, of from 0.2 to 10.

In other embodiments, the density is from 0.910 to 0.930, or from 0.930 to 0.950, or from 0.950 to 0.960.

B.3 Sealant Structure—Sealant Layer (B.3.1) and "Adjacent to" or "Next to" Layer (B.3.2)

The interior web has two exterior layers, or "skin" layers, namely the interface skin layer (layer B.1, above) and the interior skin layer, also referred to herein as the sealant layer, (B.3.1). The sealant layer is prepared from a "polyethylene sealant"—i.e., a type of polyethylene that readily melts and forms seals when subjected to sealing conditions. Those skilled in the art will recognize that two types of polyethylene are preferred for use as sealants, namely: polyethylene copolymers having a density of from about 0.88 to 0.915 g/cc; and LD polyethylene (as previously described).

In some embodiments, the use of lower density polyethylene copolymers is preferred. As a general rule, the cost of these lower density polyethylene's increases as the density decreases, so the "optimum" polyethylene sealant resin will typically be the highest density polyethylene that provides a satisfactory seal strength. A polyethylene sealant having a density of from about 0.900 to 0.914 g/cc will provide satisfactory results for many applications.

Other examples of polyethylene sealants include ethylene-vinyl acetate (EVA) and "ionomers" (e.g., copolymers of ethylene and an acidic comonomer, with the resulting acid comonomer being neutralized by, for example, sodium, zinc or lithium; ionomers are commercially available under the trademark SURLYN®).

The use of EVA and/or ionomers is less preferred because they can cause difficulties when the SUP is recycled (however, as previously noted, many recycling facilities will accept a SUP that contains up to 5% of EVA or ionomer for recycling).

B.3.2 "Next to" or "Adjacent to" Layer

We have observed that the use of r.PE in the interior web has reduced the effectiveness of the seal layer (in comparison to an interior web made with virgin HDPE instead of r.PE). The reasons for this are not completely understood. However, we have observed that the use of a selected polyethylene in the layer that is in contact with (or "adjacent to") the sealant layer improves seal performance. For clarity: the sealant layer (described above) is a skin layer that is used to seal the SUP and the "adjacent to" layer is a core layer that is adjacent to/in contact with the sealant layer and is also in contact with another core layer. In an embodiment, the "adjacent to" layer has a density of from 0.917 to 0.921 g/cc. In some embodiment, the B.3.2 sealant layer (the adjacent to layer) may include recycled polyethylene alone or blended with virgin polyethylene. In these embodiments, the density of the selected polyethylene, recycled polyethylene or the blend of the two meet the relative densities allowing the layer adjacent to the sealant skin layer to have a polyethylene having a density that is a) higher than the density of the polyethylene sealant; and b) lower than the density of the core layer that is in contact with the layer adjacent to the sealant skin layer In one embodiment the rLLDPE has a density of 0.927 g/cm$^3$ and is blended with a VLDPE having a density of 0.914 g cm$^3$.

In one embodiment the rLLDPE has a density of 0.928 g·cm$^3$ and is blended with a VLDPE having a density of 0.912 g cm$^3$.

B.5 HDPE

In an embodiment, the inner web also includes at least layer that is prepared from an HDPE composition, optionally including a nucleating agent.

In one embodiment, the second-B layer includes an HDPE composition including a nucleating agent.

HDPE is a common item of commerce. Most commercially available HDPE is prepared from a catalyst that contains at least metal (for example, chromium or a group IV transition metal—Ti, Zr or Hf).

HDPE that is made from a Cr catalyst typically contains some long chain branching (LCB). HDPE that is made from a group IV metal generally contains less LCB than HDPE made from a Cr catalyst.

As used herein, the term HDPE refers to a polyethylene (or polyethylene blend composition, as required by context) having a density of from about 0.95 to 0.97 grams per cubic centimeter (g/cc). In an embodiment, the melt index ("$I_2$") of the HDPE is from about 0.2 to 10 grams per 10 minutes.

In an embodiment, the HDPE is provided as a blend composition including two HDPEs having melt indices that are separated by at least a decade. Further details of this HDPE blend composition follow.

HDPE Blend Composition

Blend Components

Blend Component a)

Blend component a) of the polyethylene composition used in this embodiment includes an HDPE with a comparatively high melt index. As used herein, the term "melt index" is meant to refer to the value obtained by ASTM D 1238 (when conducted at 190° C., using a 2.16 kg weight). This term is also referenced to herein as "$I_2$" (expressed in grams of polyethylene which flow during the 10 minute testing period, or "gram/10 minutes"). As will be recognized by those skilled in the art, melt index, $I_2$, is in general inversely proportional to molecular weight. In one embodiment, blend component a) has a comparatively high melt index (or, alternatively stated, a comparatively low molecular weight) in comparison to blend component b).

The absolute value of $I_2$ for blend component a) in these blends is generally greater than 5 grams/10 minutes. However, the "relative value" of $I_2$ for blend component a) is more important and it should generally be at least 10 times higher than the $I_2$ value for blend component b) [which $I_2$ value for blend component b) is referred to herein as $I_2'$]. Thus, for the purpose of illustration: if the $I_2'$ value of blend component b) is 1 gram/10 minutes, then the $I_2$ value of blend component a) is, for example, at least 10 grams/10 minutes.

In one embodiment, blend component a) may be further characterized by: i) having a density of from 0.95 to 0.97 g/cc; and ii) being present in an amount of from 5 to 60 weight % of the total HDPE blend composition (with blend component b) forming the balance of the total composition) with amounts of from 10 to 40 weight %, or for example, from 20 to 40 weight %. It is permissible to use more than one high density polyethylene to form blend component a).

The molecular weight distribution is determined by dividing the weight average molecular weight (Mw) by number average molecular weight (Mn) where Mw and Mn are determined by gel permeation chromatography, according to ASTM D 6474-99. The Mw/Mn of component a) is, for example, from 2 to 20, or for example from 2 to 4. While not wishing to be bound by theory, it is believed that a low Mw/Mn value (from 2 to 4) for component a) may improve the crystallization rate and overall barrier performance of blown films and web structures prepared in accordance with this disclosure.

Blend Component b)

Blend component b) is also a high density polyethylene which has a density of from 0.95 to 0.97 g/cc (for example from 0.955 to 0.968 g/cc).

The melt index of blend component b) is also determined by ASTM D 1238 at 190° C. using a 2.16 kg load. The melt index value for blend component b) (referred to herein as $I_2'$) is lower than that of blend component a), indicating that blend component b) has a comparatively higher molecular weight. The absolute value of $I_2'$ is, for example, from 0.1 to 2 grams/10 minutes.

The molecular weight distribution (Mw/Mn) of component b) is not critical to success, though a Mw/Mn of from 2 to 4 is an example for component b).

Finally, the ratio of the melt index of component b) divided by the melt index of component a) is, for example, greater than 10/1.

Blend component b) may also contain more than one HDPE resin.

Overall HDPE Blend Composition

The overall high density blend composition is formed by blending together blend component a) with blend component b). In an embodiment, this overall HDPE composition has a melt index (ASTM D 1238, measured at 190° C. with a 2.16 kg load) of from 0.5 to 10 grams/10 minutes (for example from 0.8 to 8 grams/10 minutes).

The blends may be made by any blending process, such as: 1) physical blending of particulate resin; 2) co-feed of different HDPE resins to a common extruder; 3) melt mixing (in any conventional polymer mixing apparatus); 4) solution blending; or 5) a polymerization process which employs 2 or more reactors.

A suitable HDPE blend composition may be prepared by melt blending the following two blend components in an extruder: from 10 to 30 weight % of component a): where component a) is an HDPE resin having a melt index, $I_2$, of from 15 to 30 grams/10 minutes and a density of from 0.95 to 0.97 g/cc with, from 90 to 70 weight % of component b): where component b) is an HDPE resin having a melt index, $I_2$, of from 0.8 to 2 grams/10 minutes and a density of from 0.95 to 0.97 g/cc.

An example of a commercially available HDPE resin which is suitable for component a) is sold under the trademark SCLAIR® 79F, which is an HDPE resin that is prepared by the homopolymerization of ethylene with a conventional Ziegler Natta catalyst. It has a typical melt index of 18 grams/10 minutes and a typical density of 0.963 g/cc and a typical molecular weight distribution of about 2.7.

Examples of commercially available HDPE resins which are suitable for blend component b) include (with typical melt index and density values shown in brackets): SCLAIR® 19G (melt index=1.2 grams/10 minutes, density=0.962 g/cc); MARFLEX® 9659 (available from Chevron Phillips, melt index=1 grams/10 minutes, density=0.962 g/cc); and ALATHON® L 5885 (available from Equistar, melt index=0.9 grams/10 minutes, density=0.958 g/cc).

In some embodiments, the HDPE blend composition is prepared by a solution polymerization process using two reactors that operate under different polymerization conditions. This provides a uniform, in situ blend of the HDPE blend components. An example of this process is described in U.S. Pat. No. 7,737,220 (Swabey et al.).

In one embodiment, the HDPE composition is prepared using only ethylene homopolymers. This type of composition is suitable if it is desired to optimize (maximize) the barrier properties of the structure.

In another embodiment, the HDPE composition may be prepared using copolymers as this will enable some improvement in the physical properties, for example, impact resistance. In yet another embodiment, a minor amount (less than 30 weight %) of a lower density polyethylene may be blended into the HDPE composition (as again, this can enable some improvement in impact resistance).

In an embodiment, the HDPE blend composition described above is combined with an organic nucleating agent (as previously described) in an amount of from about 300 to 3000 parts per million by weight, based on the weight of the HDPE blend composition. The use of (previously described) calcium salt of 1-2 cyclohexane dicarboxylic acid, calcium salt (CAS 491589-22-1) is suitable. In some embodiments, it is preferred to use an HDPE composition that is prepared with a group IV transition metal (for example, Ti) when the HDPE composition contains a nucleating agent.

This type of "nucleated" core layer has been observed to provide outstanding barrier properties (i.e., reduced transmission of water, gas, and grease), which is desirable for many packaging applications.

In some embodiments, the presence of the nucleating agent has been observed to improve the modulus of the HDPE layer (in comparison to a non-nucleated layer of equivalent thickness).

The use of a nucleated HDPE blend composition of the type described above provides a "barrier" to oxygen and water transmission. The performance of this barrier layer is suitable for many goods. However, it will be recognized by those skilled in the art that improved "barrier" performance can be achieved through the use of certain "barrier" polymers such as ethylene-vinyl-alcohol (EVOH); ionomers and polyamides. The use of large amounts of such non-polyethylene barrier resins can make it very difficult to recycle films/structures/SUP that are made with the combination of polyethylene and non-polyethylene materials. However, it is still possible to recycle such structures if low amounts (less than 10 weight %, especially less than 5 weight %) of the non-polyethylene materials.

It will also be recognized by those skilled in the art that, in some embodiments, the use of certain non-polyethylene barrier resins may require the use of a "tie layer" to allow adhesion between the non-polyethylene barrier layer and the remaining layers of polyethylene.

Printing Process

As previously noted, in some embodiments, the laminated structure of this disclosure is printed at the interface between the two webs. Suitable processes include the well-known flexographic printing and roto gravure printing techniques, which typically use nitro cellulose or water based inks.

The outer web (described above) forms the exterior of the SUP and the inner web forms the inside of the SUP. Persons skilled in the art commonly refer to the outer web as the "print" web and the inner web as the "sealant" web.

Lamination/Fabrication Process

One step in the fabrication of the laminated structure requires the lamination of the first web to the second web. There are many commercially available techniques for the lamination step, including the use of a liquid glue (which may be solvent based, solvent-less, or water based); a hot melt glue, and thermal bonding.

The SUP packages described above are laminated. It will be understood by skilled persons that a similar SUP could be prepared by coextrusion (using the same materials in the same layers as the laminated SUP). However, the laminated SUP can be printed at the web interface (whereas the coex SUP is printed on a skin layer)—accordingly, the print quality (and scuff resistance) of the laminated SUP is superior.

In one embodiment, the inner web B has a total thickness that is equal to the thickness of web A. In other embodiments the web B can be from about twice that of the outer web A to 5 times that of the outer web A.

In an embodiment, the total thickness of the inner web is from 1.3 to 6.0 mils, from 1.8 to 2.6 mils, or for example, from 2.0 to 2.5 mils.

In an embodiment, the first layer thickness is from up to 10-20% (of the total thickness of the three layers); the second layer is from 40 to 70%; and the third layer is from 10 to 15% and the fourth layer is from 10-20%; and the fifth layer 10-20%. But one skilled in the art would recognize that, with equipment for up to 9 layers further division of the structure can be accomplished as more layers are available. It should be noted that the first and second layers could be further divided into multiple layers adding component to modify properties of the sealant web that do not involve the seal properties directly. Such properties could include moisture barrier or a desire to increase the PCR content of the overall sealant web. The maximum number of total layers will be limited by the number of layers possible in an extrusion unit (known as a co-extrusion blown film line). In addition, one skilled in the art would recognize that each of the extrusion unit capable of, for example, making nine layers, may nonetheless be used to make films comprised of fewer layers.

In another embodiment the inner web further includes a barrier layer, wherein the barrier layer is located between the first-B layer and the second-B layer. In some embodiments, the barrier layer includes EVOH, with the further proviso that the total weight of the barrier layer is less than 5 weight %, based on the combined weight of the EVOH and the total weight of polyethylene used in the complete structure. In another embodiment, two tie layers are included, such that a first tie layer is located on one side of the barrier layer and a second tie layer is located on the other side of the barrier layer.

In other embodiments, the outer web A may have a thickness of from about 1 to about 1.4 mils and the inner web may have a thickness of from about 2 to about 3 mils.

In another embodiment, the outer web includes an exterior skin layer made from HDPE (having a thickness of, for example, about 0.8 mils) and a layer of LLDPE having a thickness of, for example, about 0.4 mils. In this embodiment, the inner layer may be an A/B/C structure where layer A is made from LLDPE (having a thickness of, for example, about 0.4 mils; layer B is nucleated HDPE (having a thickness of, for example, about 1.5 mils) and layer C is sealant resin (such as VLDPE) having a thickness of, for example, about 0.3 mils.

It will be recognized by those skilled in the art that the above described thickness may be easily modified to change the physical properties of the SUP. For example, the thickness of the HDPE layers may be increased (if it is desired to produce a stiffer SUP) or the thickness of the LLDPE layer(s) may be increased to improve impact resistance.

The total thickness of the laminated structure (i.e., outer web and inner web) is about 3 to about 4 mils in one embodiment. The SUP is then prepared from the laminated structure using techniques and machines that are known to those skilled in the art. In one embodiment, the laminated structure is sealed using heat seals to form the SUP. In another embodiment, the seals may be formed using ultrasonic sealing.

Examples

Test procedures for characterizing SUP packages are briefly described below.
1. Melt Index: "$I_2$", was determined according to ASTM D1238. [Note: $I_2$ measurements are made with a 2.16 kg weight at 190° C.] Test results are reported in units of grams/10 minutes, or alternatively, decigrams/minute (dg/min).
2. Density was determined using the displacement method according to ASTM D792.
3. Gloss was determined by ASTM D2457.
4. Haze was determined by ASTM D1003.

Material List

The following polyethylenes were used in the examples.

| | Resin Type | Melt Index (g/10 min) | Density (g/cc) | Comonomer | Web |
|---|---|---|---|---|---|
| 1. | ZN-1 | 1 | 0.958 | none | print |
| 2. | ZN-2 | 0.8 | 0.934 | hexene | both |
| 3 | ZN-3 | 0.55 | 0.934 | octene | seal |
| 4 | DCT-1 | 1 | 0.914 | octene | sealant |
| 5. | DCT-2 | 4 | 0.912 | octene | sealant |
| 6 | SSC-1.nuc | 1.2 | 0.967 | none | sealant |
| 7 | rLLDPE | 1.5 | 0.928 | octene | sealant |
| 8 | rHDPE-1 | 0.6 | 0.962 | mixed | sealant |
| 9 | rHDPE-2 | 0.6 | 0.960 | mixed | sealant |

The prefix ZN indicates that the polyethylene was prepared with a Ziegler Natta catalyst system. The prefix SSC indicates that the polyethylene was prepared with a single site catalyst system. The term—(nuc) indicates that the resin contains a nucleating agent (aiming point of 1200 parts per million by weight of a commercially available nucleating agent sold under the trademark HYPERFORM® 20E by Milliken Chemicals).

Outer Web

Four blown films were prepared as candidates for the outer web of the stand up pouch. The films were prepared on a conventional blown film line. The total thickness of all the films was 2.35 mils (0.059 mm). Films 1.1 and 1.4 were made from only one resin. Films 1.2, 1.3, and 1.5 were multilayer structures containing HDPE and either MDPE or LLDPE. The Machine Direction (MD) and Transverse Direction (TD) stiffness values (expressed in g/cm) for each of these films is shown in Table 1. The thickness of the ZN-1 layer in the multilayer films was 1.15 mils.

Seal tests were completed by pressing two strips of film together (sealant layer to sealant layer) for a fixed period of time at a set pressure and temperature. The temperature was varied to determine a minimum seal temperature that is required to provide a specified/minimum seal strength (reported as the seal initiation temperatures). Sealing temperatures are increased until seal strength starts to decrease (due to melting/failure of the polymer). The results are plotted in the Figures.

Seal strength is determined by an instrument that pulls the seal apart and records the force necessary to do so. The test methods for determining some seal characteristics are provided below.

Seal Strength

Seal Strength testing was conducted on an instrument designed for that purpose and sold under the trade name INTSTRUME™ 5—Head Universal Tester. The testing was conducted in general accordance with the procedures recommended by the instrument maker.

Hot Tack

Hot tack is a measure of the ability of a seal to withstand load before it is fully cooled; this ability is important for form-fill and seal packaging.

The testing was conducted with an instrument designed for the purpose and sold under the name J&B Hot Tack Tester. The tests were conducted in general accordance with the procedures recommended by the instrument maker. Specific conditions are summarized below:

Seal pressure: 0.27 N/mm2

Seal Time: 0.5 s

Cool time: 0.5 s

Clamp Separation Rate: 200 mm/sec

Peel Offset: 5 mm

Sample width: 25 mm

Sample length: 8 mm

TABLE 2

| PRINT WEB FILMS | | |
| --- | --- | --- |
| | | STRUCTURE |
| 1.1 | | ZN-1 |
| 1.2 | | ZN-1/SSC-2 |
| 1.3 | | ZN-1/ZN-2 |
| 1.4 | | ZN-2 |
| 1.5 | | ZN-1(nuc)/ZN-2 |

A (comparative) inner web having a single sealant layer is shown in Table 3.

TABLE 3

| (Comparative) | | |
| --- | --- | --- |
| Layer | Resin | Amount |
| 1 | ZN-3 | 30% |
| 2 | SSC-1.nuc/rHDPE-1 | 40% |
| 3 | DCT-1 | 30% |

An inventive inner web, with a two layer sealant system (layers 3 and 4) is shown in Table 4. Layer 4 is the sealant layer (a skin layer) and Layer 3 is the "adjacent to" layer.

TABLE 4

| Inner Web Structure (Inventive) | | |
| --- | --- | --- |
| Layer | Resin | Amount |
| 1 | ZN-2 | 20% |
| 2 | rHDPE-1 | 55% |
| 3 | DCT-1/rLLDPE | 10% |
| 4 | DCT-1 | 15% |

Another suitable four-layer film for the inner web is shown in Table 5 (again, layer 4 is the sealant layer and layer 3 is the "adjacent to" layer).

TABLE 5

| Inner Web Structure | | |
| --- | --- | --- |
| Layer | Resin | Amount |
| 1 | ZN-2 | 20% |
| 2 | rHDPE-1 | 55% |
| 3 | DCT-1/rLLDPE | 10% |
| 4 | DCT-1 | 15% |

A suitable five layer film for the inner web is shown in Table 6. Layer 5 is the sealant layer and layer 4 is the "adjacent to" layer).

TABLE 6

| Inner Web | | |
| --- | --- | --- |
| Layer | Resin | Amount |
| 1 | ZN-2 | 5% |
| 2 | rLLDPE/rHDPE-2 | 15% |
| 3 | rHDPE-1 | 55% |
| 4 | DCT-1/rLLDPE | 10% |
| 5 | DCT-1 | 15% |

Examples of seven layer films for the inner web are shown in Tables 7-9. Layer 7 is the sealant layer and layer 6 is the "adjacent to" layer).

TABLE 7

| Layer | Resin | Amount |
| --- | --- | --- |
| 1 | ZN-2 | 5% |
| 2 | rLLDPE/rHDPE-2 | 15% |
| 3 | SSC-1.nuc | 5% |
| 4 | rHDPE-1 | 45% |
| 5 | SSC-1.nuc | 5% |
| 6 | DCT-1/rLLDPE | 10% |
| 7 | DCT-1 | 15% |

TABLE 8

| Layer | Resin | Amount |
|---|---|---|
| 1 | ZN-2 | 5% |
| 2 | rLLDPE/rHDPE-2 | 15% |
| 3 | SSC-1.nuc | 7.5% |
| 4 | rHDPE-1 | 40% |
| 5 | SSC-1.nuc | 7.5% |
| 6 | DCT-1/rLLDPE | 10% |
| 7 | DCT-1 | 15% |

TABLE 9

| Layer | Resin | Amount |
|---|---|---|
| 1 | ZN-2 | 5% |
| 2 | rLLDPE/rHDPE-2 | 15% |
| 3 | SSC-1.nuc | 7.5% |
| 4 | rHDPE-1 | 40% |
| 5 | SSC-1.nuc | 7.5% |
| 6 | DCT-1/rLLDPE/DCT-2 | 10% |
| 7 | DCT-1 | 15% |

The structure shown in Table 8 has a very good balance of seal and hot tack properties, optical properties and rigidity. It is possible to improve the optical properties (reduce haze) by replacing SSC-1 with ZN-1 but this is done at a cost of reduced rigidity and MVTR.

The structure shown in Table 9 has a very good balance of seal and hot tack properties, optical properties and rigidity. It is possible to improve the optical properties (reduce haze) by replacing SSC-1 with ZN-1 but this is done at a cost of reduced rigidity and MVTR.

FIG. 1 graphically shows the cold seal profile enhancement.

TABLE 10

| Seal Characteristics of Sealant Webs | | | | |
|---|---|---|---|---|
| | Hot Tack Onset Temp ° C. | Max Hot Tack Strength (N) | Seal Initiation Temp ° C. | Max Seal Strength (N) |
| Table 3 | 83.2 | 7.0 | 101.9 | 30.7 |
| Table 4 | 82.6 | 6.1 | 105.6 | 31.5 |
| Table 8 | 78.4 | 8.5 | 98.0 | 38.0 |
| Table 9 | 82.8 | 7.5 | 98.6 | 36.8 |

Finished Laminated Structure

The finished laminated structure is prepared by laminating the first (outer) web to the second (inner) web.

Table 10 provides representative data for two finished structures.

INDUSTRIAL APPLICABILITY

A Stand Up Pouch (SUP) made from polyethylene incorporates a seal structure that improves the manufacture and use of the SUP. The SUP is useful for packaging a wide variety of consumer goods.

The invention claimed is:

1. A laminated structure that is made from polymeric materials, said laminated structure comprising:
   A) an outer web comprising:
      A.1) a first-A layer comprising an HDPE composition, and
      A.2) a second-A layer comprising polyethylene chosen from LLDPE, MDPE, and HDPE;
   B) an inner web comprising:
      B.1) a first-B layer that is in contact with said outer web, wherein said first-B layer comprises polyethylene chosen from LLDPE and MDPE,
      B.2) a second-B layer comprising recycled polyethylene, and
      B.3) a sealant structure comprising:
         B.3.1) a sealant skin layer comprising a polyethylene sealant, and
         B.3.2) a layer adjacent to said sealant skin layer comprising a polyethylene having a density that is a) higher than the density of said polyethylene sealant; and b) lower than the density of the second-B layer, wherein said layer adjacent to said sealant skin layer comprises recycled linear low density polyethylene and the second-B layer is in contact with said layer adjacent to said sealant skin layer; and
   wherein
      I) said outer web is laminated to said inner web, and
      II) said HDPE, MDPE, LLDPE, recycled polyethylene and polyethylene sealant collectively form at least 95 weight % of said polymeric materials that are used to prepare said laminated structure.

2. A laminated structure that is made from polymeric materials, said laminated structure comprising:
   A) an outer web including:
      A.1) a first-A layer including an HDPE composition, and
      A.2) a second-A layer including polyethylene chosen from LLDPE, MDPE, and HDPE,
      A.3) a third-A layer including polyethylene chosen from LLDPE, MDPE, and HDPE;
   B) an inner web including:
      B.1) a first-B layer that is in contact with the outer web, wherein the first-B layer includes polyethylene chosen from HDPE, LLDPE and MDPE,
      B.2) a second-B layer including recycled polyethylene, and
      B.3) a sealant structure including:
         B.3.1) a sealant skin layer including a polyethylene sealant, and
         B.3.2) a layer adjacent to the sealant skin layer including a polyethylene having a density that is a) higher than the density of the polyethylene sealant; and b) lower than the density of the second-B layer, wherein said layer adjacent to said sealant skin layer comprises recycled linear low density polyethylene and the second-B layer is in contact with the layer adjacent to the sealant skin layer; and
   wherein
      I) each of the outer and inner webs optionally comprise at least one additional layer between A.1 and A.3 and B.1 and B.3,
      II) the outer web is laminated to the inner web, and
      III) the HDPE, MDPE, LLDPE, recycled polyethylene and polyethylene sealant collectively form at least 95 weight % of the polymeric materials that are used to prepare the laminated structure.

3. The laminated structure of claim 1 wherein said layer adjacent to said sealant skin layer has a density of from 0.917 to 0.921 g/cc and said polyethylene sealant has a density of from 0.88 to 0.915 g/cc.

4. The laminated structure of claim 1 wherein said polyethylene sealant has a density of from 0.900 to 0.914 g/cc.

5. The laminated structure of claim 1 wherein said inner web further comprises an additional layer between B.1 and B.3 comprising HDPE optionally containing a nucleating agent.

6. The laminated structure of claim 1 wherein said second-B layer comprises HDPE containing a nucleating agent.

7. The laminated structure of claim 2 wherein said outer web further comprises an additional layer between A.1 and A.3 comprising HDPE optionally containing a nucleating agent.

8. The laminated structure of claim 1 wherein said inner web further comprises a barrier layer, wherein said barrier layer is located between said first-B layer and said second-B layer.

9. The laminated structure of claim 1 wherein said layer adjacent to said sealant skin layer further comprises virgin VLDPE.

10. The laminated structure of claim 1 wherein said inner web further comprises at least one layer comprising a blend of HDPE, MDPE, or LLDPE with recycled polyethylene.

11. The laminated structure of claim 8 wherein said barrier layer comprises EVOH, with the further proviso that the total weight of said barrier layer is less than 5 weight %, based on the combined weight of said EVOH and the total weight of polyethylene used in said structure.

12. The laminated structure of claim 8 wherein a first tie layer is located on one side of said barrier layer and a second tie layer is located on the other side of said barrier layer.

13. A stand up pouch that is prepared from the structure of claim 1.

14. The laminated structure of claim 2 wherein said layer adjacent to said sealant skin layer has a density of from 0.917 to 0.921 g/cc and said polyethylene sealant has a density of from 0.88 to 0.915 g/cc.

15. The laminated structure of claim 2 wherein said polyethylene sealant has a density of from 0.900 to 0.914 g/cc.

16. The laminated structure of claim 2 wherein said inner web further comprises an additional layer between B.1 and B.3 comprising HDPE optionally containing a nucleating agent.

17. The laminated structure of claim 2 wherein said second-B layer comprises HDPE containing a nucleating agent.

18. The laminated structure of claim 2 wherein said inner web further comprises a barrier layer, wherein said barrier layer is located between said first-B layer and said second-B layer.

19. The laminated structure of claim 2 wherein said layer adjacent to said sealant skin layer further comprises virgin VLDPE.

20. A stand up pouch that is prepared from the laminated structure of claim 2.

* * * * *